INVENTORS
Harold M. Leeper
Peter W. Ramwell

United States Patent Office 3,730,835
Patented May 1, 1973

3,730,835
NOVEL DEVICE COATED WITH A PROSTA-
GLANDIN AND PREPARATION THEREOF
Harold M. Leeper, Palo Alto, and Peter W. Ramwell,
Portola Valley, Calif., assignors to ALZA Corporation
Filed Apr. 15, 1971, Ser. No. 134,222
Int. Cl. A61f 1/24; A61m 5/14; A61n 5/18
U.S. Cl. 195—1.7
13 Claims

ABSTRACT OF THE DISCLOSURE

A device for adding a platelet anti-aggregation prostaglandin to a fluid containing platelets, or to platelets, the device comprising a substrate of increased surface area coated with a platelet anti-aggregation prostaglandin that releases the prostaglandin on contact by the fluid or platelet. The device is prepared by shaping and depositing a prostaglandin on the substrate by evaporation, solution deposition, coating in a fluidized bed and the like.

BACKGROUND OF THE INVENTION

Field of the invention

This invention relates to a novel and useful article of manufacture. More particularly, the present invention pertains to a device for harvesting, processing and preserving platelets comprising a substrate of increased surface area coated with a platelet anti-aggregation agent, a prostaglandin, that is released from the device to a biological media containing platelets, or to platelets per se as required for preserving their function and integrity and simultaneously inhibiting platelet aggregation. An aspect of the invention concerns the preparation of the device by forming, and then coating the device by evaporation, solution deposition, fluidized bed coating, and the like.

Description of the prior art

The use of platelet transfusions as a therapeutic agent in thrombocytopenic or thrombocytopathic conditions is indicated as accepted practice in the medical arts. An increased number of physicians are prescribing the use of platelets for these and other conditions, and much effort is being expended to make more platelets available. However, these efforts have not met with general acceptance by the medical art because the main and most serious problem encountered during the preparation, isolation and storage of the platelets is platelet clumping or platelet aggregation and a poor shelf life. These conditions are usually caused by swelling that results on storage, from induced chemical stimulation or from varying degrees of vibrations and agitations that occur in the preparation of platelets prepared from whole blood, or from plasma often in the absence of an acceptable platelet preserving agent. Various attempts have been made by the prior art to overcome the clumping of platelets and to improve the shelf life of platelets. These methods frequently involved the adding of an anti-clumping agent to whole blood before the platelets were separated therefrom; but, the chemical reagents used often had an inherent disadvantage that in the concentrations employed a large amount of the reagent was transported with the platelets to the recipient and inducing thereby an unwanted and unneeded chemical, often possessing side effects into the recipient. Other prior art attempts involved the desire to lessen the efforts of vibrations and agitations produced during the separation of the platelets from the whole blood but the lack of a device for adding a preserving agent during processing has hindered any acceptable success for this attempt.

Recently, a naturally occurring family of physiologically active and therapeutically acceptable agents, known as prostaglandins, were reported to possess a platelet preserving ability, that is, to inhibit platelet aggregation while not being subjected to the many difficulties associated with the prior art. The prostaglandins' platelet preserving property was reported in Biochimica et Biophysica Acta, vol. 187, pages 285 to 292, 1969; Prostaglandins, Nobel Symposium II, pages 242 to 252, 1967, Almquist and Wiksell, Stockholm; and, Microvascular Research, vol. 2, pages 294 to 301, 1970. While the prior art recognized the anti-clumping properties of the prostaglandins, it did not conceive of any useful device or method for adding prostaglandins to biological media, especially those media containing platelets. Thus, prior to this invention, a critical need existed for a device and method for adding prostaglandins to biological media, especially blood and plasma, during the collecting and processing of them to obtain platelets. Also, a device was needed to effect platelet separation more efficiently and economically and to concomitantly increase the platelets useful life.

Objects of the invention

Accordingly, in the light of the above presentation it becomes an immediate object of this invention to provide a novel device for adding prostaglandins to biological media.

Another object of the present invention is to overcome the difficulties associated with the prior art.

Yet another object of the invention is to provide a device of large surface area coated with prostaglandins that are released from the surface to a media or fluid on contact by the media or fluid.

Still yet another object of the invention is to provide a device carrying on its exposed surface prostaglandins that are pulsed and continually made available to a media fluid on intimate contact by the media or fluid.

Yet still a further object of the invention is to provide a novel prostaglandin carrying device that can be inserted into standard blood collecting tubes and blood collecting bags to make available to blood and plasma, the prostaglandins from the device.

Still another object of the invention is to make available to the art a shaped device for carrying prostaglandins, the device having a high area of exposed surface relative to the total volume of the device and possessing a level of engineering strength and toughness to survive mechanical handling when incorporated into conventional blood collection software.

These objects, as well as other objects, features and advantages of this invention will become more readily apparent to those skilled in the art from the following detailed description, the drawings and the accompanying claims.

SUMMARY OF THE INVENTION

The invention concerns a novel article of manufacture, mainly a device, for adding a platelet anti-clumping prostaglandin to blood, plasma or other biological fluids containing platelets for inhibiting aggregation of the platelets while collecting and isolating of the platelets therefrom. The device comprises a shaped substrate having a high area of exposed surface coated with a platelet anti-clumping prostaglandin and a carrier, that can easily be pulsed and continually released on contact by a biological fluid containing platelets or platelets per se. The device is fabricated by first shaping the substrate and then coating it with the prostaglandin and the carrier by spraying, evaporation, dipping and the like. The device can be inserted into standard blood collection tubes, or it can be added to standard blood bags for releasing the prostaglandin therefrom.

DESCRIPTION OF THE DRAWINGS

The following drawings, described in detail, are examples of various shaped devices with a relative large surface area. The devices are multi-curved and have a large surface area produced by a linear device of a length equal to the length of the shaped device. These shaped devices, with a large surface area prepared according to the spirit of the invention are not to be construed as limiting the scope of the invention as other shaped devices will readily be apparent to those versed in the art in the light of this disclosure and the accompanying claims.

In FIG. 4 the several illustrated strands are loosely formed and carry a coating 21 on their surface; however, the strands may be drawn in wards to each other for insertion in axial alignment into tubing of small inside diameter. While the drawing illustrates a device with a few strands, it is to be understood that the invention can use any suitable number of strands to increase or decrease the amount of area available for coating with a platelet anti-clumping prostaglandin. The device of FIG. 4 can also have its strands fabricated into a grid or screen like pattern. The strands in a grid or screen would traverse across the inside diameter of the tube to meet the biological fluid passing through the tube. With the grid or screen pattern, one or more can be placed in a tube; for example, if two screens are used they can be placed from 0.1 to 1 cm. or more apart with, if desired, one screen rotated at an angle, for example 45°, from the other placed screen. The use of two or more screens will also assure excellent mixing of the protaglandin with the biological fluid flowing in the tube.

In FIG. 8 the device 33 is placed in tube 32 that connects two standard bags 30 and 31. In operation, blood in bag 30 is centrifuged and the plasma containing the platelets is transferred through tube 32 contacting device 33 and thereby add the anti-clumping prostaglandin to the plasma as it flows to bag 31. The above devices usually have a large surface area relative to their total volume. For example, if the device has a diameter of about 0.5 mm. the reciprocal cm. for the area to volume ratio is approximately 80:1; for a diameter of about 1 mm. the area to volume ratio is 40:1; for a diameter of 2 mm. the area to volume ratio is 20 to 1; for a diameter of 4 mm. the area to volume ratio is 10 to 1; for a diameter of 6 mm. the area to volume ratio is 7 to 1; for a diameter of 8 mm. the area to volume ratio is 5 to 1; and the like. Generally, the total surface area to volume ratio for the devices is at least 5 $cm.^2$ of area per 1 $cm.^3$ of volume. It is noted, that in the above illustrations, the drawings are not necessarily drawn to any scale or in a relative proportion as to size or shape as the drawings are presented therein to aid in an understanding of the invention.

DETAILED DESCRIPTION OF INVENTIVE EMBODIMENTS

Figure 1:
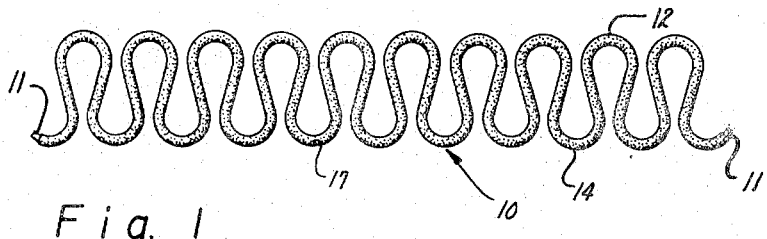
FIG. 1 is a schematic view of a novel device 10 arranged in normal sinuous or serpentine form. The device is generally characterized by a relatively large exposed area that can be confined within a small space. The general dimensions of the device are not critical, but the boundary sides formed by curve 12 and curve 14 usually correspond to the internal diameter of a standard blood collection tube where the device is subsequently placed. The device 10 may have any number of successive curvatures to make the sinuous form, and the number of curvatures or the length of the sinuous form usually will depend on the amount of material coated 17, not shown, or carried by the device on metal 11 for release to a biological media. Suitable examples of this feature, as well as examples of coatings and coated devices comprising a platelet anti-clumping prostaglandin and a carrier on the device, will appear later in the specification.
Figure 3:
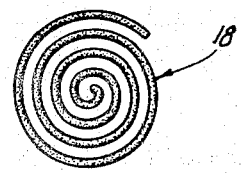
FIG. 3 diagrammatically depicts a helical coil shaped device 18 of the invention. The natural helix 18 comprises a number of helical coils wound around one another substantially as shown. The helix may be formed in its present shown shape, by extruding under heat, and it normally will tend to maintain its helical configuration when coated, not shown, unless it is pulled.
Figure 2:
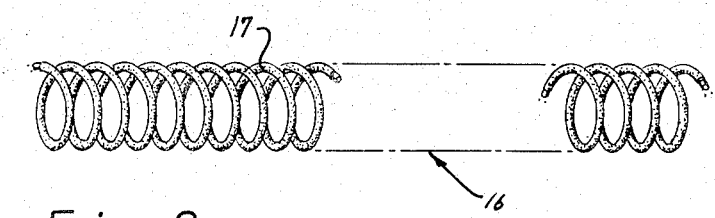
FIG. 2 is a side elevational view of a spring 16 embodiment of the invention in expanded position prior to its insertion into a tube or blood collection bag. The spring member 16 has a configuration of a spiral spring which becomes somewhat flattened when the spring windings are placed within a tube. Although spring member 16 is illustrated with 14 windings it will be understood that fewer or more windings can be used. The spring member 16 in addition to having large surface area for carrying a coating 17 of platelet anti-clumping prostaglandins, also adds support and flexibility to a tube on insertion into the tube. This latter feature increases the usefulness of the device especially during the collecting and separation of platelets where the use of scientific apparatus is employed.
Figure 4:
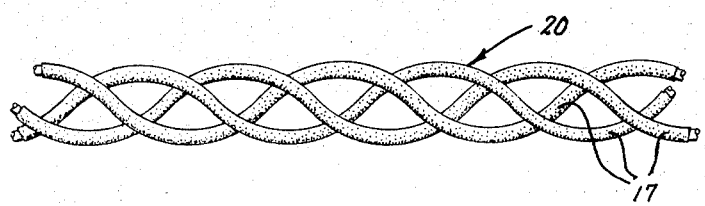
FIG. 4 is an illustration of a multiplicity of curved substrates 20 that are interwound for forming a coated 17 device according to the invention.
Figure 6:
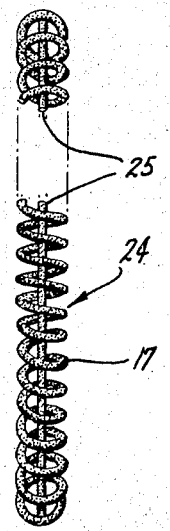
FIG. 6 is a perspective view of a spring-like coil configuration device 24 suitable coated 17 for the purposes of the invention. Spring device 24 may be formed of any number of consecutive turns and the number of turns will correspond to the restraining member 25 disposed within spring 24 and joined to its ends. Restraining member 25 adds support to the device while simultaneously assisting spring 24 to essentially maintain its dimensions for use in standard blood collecting tubular apparatus.
Figure 5:
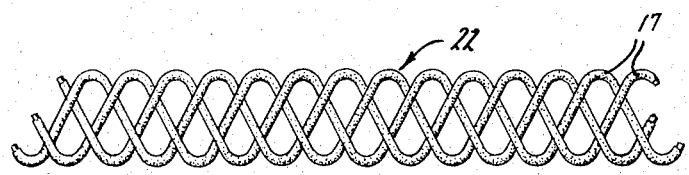
FIG. 5 is an illustration of an interwoven device 22 formed by braiding together two or more filaments to form a device with a large coated 17 area, relative to the length and volume of the device. As with FIG. 4, the device can be formed of a plurality of strands, with a single strand coated 17 or all strands may be coated, and it can be any desired length. The width of the device measured at the point of curvature of two peaks will usually correspond to the inside diameter of a blood collecting tube where the device is used.
Figure 7:
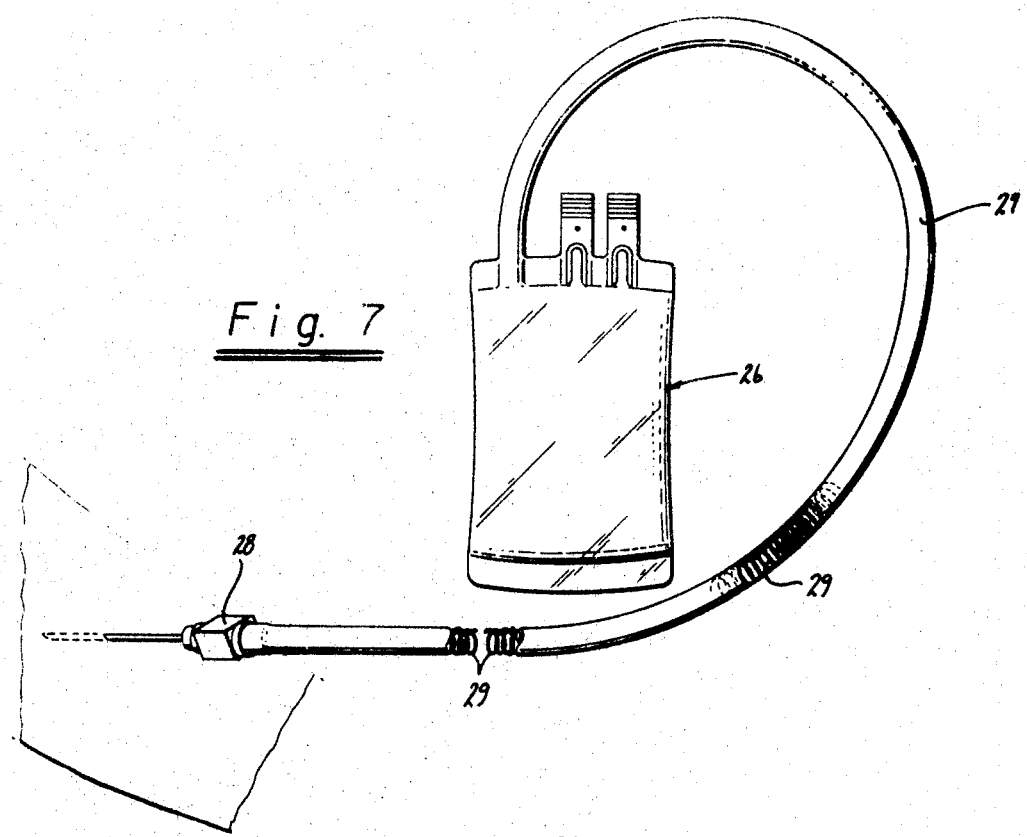
FIG. 7 is an elevational view showing a conventional parenteral container 26 suitably equipped with an integral collection tube 27 and a needle 28 for insertion into a host. Tube 27 is illustrated with a novel device 29, prepared according to the spirit of the invention and coated, not shown, with a platelet anti-clumping prostaglandin, positioned in tube 27. In operation, blood or other biological fluids containing platelets, enter needle 28 flow into tube 27, made of standard inert materials, like nylon, poly (vinyl) chloride, polyethylene, polyesters and the like, and through the plurality of exposed curved surfaces of device 29 to pick up the releasable platelet anti-clumping prostaglandin coated on device 29. The blood then transits into container 26.

In attaining the objects, features and advantages of the invention it has now been unexpectedly found that prostaglandins processing platelet anti-clumping effects, the art terms anti-clumping and anti-aggregation are considered herein as functional equivalents, can be coated onto a substrate for pulsed or continual release of the prostaglandins in standard blood collection systems. Many prostaglandins are art known to possess platelet anti-clumping ability in varying degrees and they are therefore suitable for the purpose of this invention. These prostaglandins are listed according to their art known abbreviations with their chemical names immediately following in brackets:

$PGE_1$ [$11\alpha,15(S)$-dihydroxy-9-oxo-13-trans-prostenoic acid or 3-hydroxy-2(3-hydroxy-1-octenyl)-5-oxo-cyclopentane heptanoic acid];

$PGE_2$ [$11\alpha,15(S)$-dihydroxy-9-oxo-5-cis,13-trans-prostadienoic acid or 7-[3-hydyroxy-2(3-hydroxy-1-octenyl)-5-oxo-cyclopentyl]-5-heptenoic acid];

$PGA_1$ [$15(S)$-hydroxy-9-oxo-10,13-trans-prostadienoic acid or 2-(3-hydroxy-1-octenyl)-5-oxo-3-cyclopentene-1-heptanoic acid];

$PGA_2$ [$15(S)$-hydroxy-9-oxo-5-cis-10,13-trans-prostadienoic acid or 7-[2-(3-hydroxy-1-octenyl)-5-oxo-3-cyclo-penten-1-yl]-5- heptenoic acid];

$PGF_1\alpha$ [$9\alpha,11\alpha,15(S)$-trihydroxy-13-trans-prostenoic acid or 3,5-dihydroxy-2-(3-hydroxy-1-octenyl)-cyclopentane heptanoic acid];

$PGF_2\alpha$ [$9\alpha,11\alpha,15(S)$-trihydroxy-5-cis,13-trans-prostadienoic acid or 7-[3,5-dihydroxy-2-(3-hydroxy-1-octenyl)-cyclopentyl]-5-heptenoic acid];

8-iso-$PGE_1$ [$11\alpha,15(S)$-dihydroxy-9-oxo-13-trans-8-iso-prostenoic acid]; and, $\omega$-homo-$PGE_1$ [$11\alpha,15(S)$-dihydroxy-9-oxo-13-trans-$\omega$-homoprostenoic acid], and the diastereomers thereof.

The pharmaceutically acceptable, non-toxic salts of the prostaglandins can also be used including the non-toxic alkali metal and alkaline earth metal bases such as sodium, potassium, calcium, lithium, copper and magnesium, the hydroxides and the carbonates thereof; ammonium salts and substituted ammonium salts, for example, the non-toxic salts of trialkylamines such as triethylamine, trimethylamine, triisopropylamine, procaine, epinephrine, dibenzylamine, triethanolamine, N-benzyl-betaphenylethylamine, ethyldimethylamine, benzylamine, N-(lower)-alkyl-piperidines such as N-ethylpiperidine, 2-methylpiperidine and other acceptable amines.

The pharmaceutically acceptable prostaglandin acylated derivatives formed by reacting the above mentioned prostaglandins' hydroxyl group at positions C–9, C–11 and C–15 with the corresponding carboxylic acid chloride or carboxylic acid anhydride of 2 to 18 carbon atoms can also be used herein. Representative of acceptable acyl moieties are formyl, acetyl, propionyl, butyryl, valeryl, caproyl, octanoyl, lauroyl, palmitoyl, stearoyl, oleoyl; and the like.

The prostaglandins are known to be effective inhibitors of aggregation in platelet rich plasma in various concentrational ranges, for example, $PGE_1$ about 10 to 20 ng/ml.; $PGE_2$ about 10.0 to 15.0 $\mu$g./ml.; $PGA_1$ about 25 to 35 $\mu$g./ml.; $PGA_1$ about 65 to 75 $\mu$g./ml.; $PGF_1\alpha$ about 45 to 55 $\mu$g./ml.; $PGF_2\alpha$ about 90 to 100 $\mu$g./ml.; 8-iso-$PGE_1$ about 10 to 20 ng/ml.; and $\omega$-homo-$PGE_1$ about 3 to 10 ng/ml.

hTe prostaglandins are applied as a coating onto the various substrates, as illustrated above, by first mixing the compound with a carrier. Carriers useful for this purpose are those carriers that do not adversely effect the prostaglandin, blood, platelets or the recipient. The carriers are usually substances that have met with acceptance as blood plasma substitutes and are often characterized by their non-thrombogenicity. Exemplary of carriers are poly(vinyl pyrrolidone), poly(vinyl alcohol), dextran, sodium alginate and non-thrombogenic plastics, such as acrylates, vitreous carbons, silicones, polyolefins such as poly(ethylene) and poly(propylene), poly(electrolyte) complexes formed of an ionically-cross-linked poly(electrolyte) complex of a poly(anion) and a poly(cation) as set forth in U.S. 3,475,358; and, other materials that are non-thrombogenic and will pulse release the prostaglandin on contact by blood and the like. A small amount of compatible anti-oxidant may be incorporated into the prostaglandin carrier mixture to assist in preserving the prostaglandins. Among the antioxidants which may be mentioned are propyl gallate, butylated hydroxy anisole, gallic acid, vitamin C, nordihydroguaiaretic acid, vitamin E, mixed tocopherols and similar biological acceptable agents. Generally, the amount of anti-oxidant will vary with the various prostaglandins but it will usually be, when employed, about 0.2 mg. to 1.5 mg. of anti-oxidant for 100 mg. to 300 mg. of prostaglandin.

The shape substrate coated with prostaglandin is usually formed from commercially available materials that do not adversely effect the prostaglandin, platelets, blood, plasma, and like fluids, or the hosts. Generally metal substrates are preferred and these include materials such as, tantalum, titanium, stainless steel, Nichrome wire, platinum wire of 99.7 percent purity, alloys comprising nickel, cobalt, platinum, iridium, copper, iron, manganese, tungsten and the like. These alloys include wires of assorted gauges that are commercially available as Kovar® alloy consisting of about 29 percent nickel, 17 percent cobalt, 0.3 percent manganese and the balance iron; Sylvania No. 4 alloy consisting of 42 percent nickel, 5.5 percent chromium and the balance iron; the alloy sold under the trade name Fernico consisting of 54 percent iron, 28 percent nickel and 18 percent cobalt; the alloy sold under the trade name Dumet containing a copper coated composition of 45 percent nickel and 55 percent iron; the alloy comprised of platinum and 10 percent iridium; the commercially available alloy vitallium consisting of cobalt, chromium and molybdenum; and the like alloys and metals.

The prostaglandin anti-aggregation agent can be applied singly or in combination with other prostaglandins to the metal or the alloy substrate by standard art known techniques. Usually the prostaglandin and a carrier are first mixed with a solvent then applied to the substrate. The operations may be mechanically, manually or electrically performed and they include techniques such as cold dip, brush, hot dip, soaking, continual rinse, solution deposition, coating in a fluidized bed, and the like. Any excess solvent used in the coating processes is removed by evaporation, vacuum stripping, drying in a gaseous stream of an inert atmosphere such as nitrogen, argon or the like, drying in dry air; and the like. The thickness or depth of the prostaglandin coating produced by these methods onto any given substrate will of course vary but it will usually be a concentrate of prostaglandin that will release an effective amount of prostalglandin for preventing platelet clumping to any preselected volume. Generally the coating will be about 1 micron to 5 millimeters thick; or about 0.1 microgram to 500 micrograms of biologically active platelet aggregation inhibiting prostaglandin for each centimeter square of exposed substrate surface.

Representative of solvent vehicles acceptable for the purpose of the present invention include the polar type solvents such as tetrahydrofuran, chloroform, acetone, methylene chloride, ethylene chloride, dioxane, isobutyl ketone, methyl isobutyl ketone, dimethylether, diethylether, alkanols such as methanol, butanol, n-amyl alcohol, 2-ethylhexyl alcohol, ethylene glycol, ethanol, isopropanol, hexanol, butanol, pentanol and lesser polar solvents such as benzene, carbon tetrachloride, cycloalkanes such as cyclopentane, 1,2-dimethylcyclopentane, cyclooctane, isopropylchlorhexane, cyclohexane, methylcyclohexane, alkanes such as 3-methylpentane, n-hexane, n-heptane, lower fatty acid esters like amyl acetate, ethylacetate and the like.

DESCRIPTION OF INVENTIVE EXAMPLES

The following examples will further serve to illustrate the present invention and these examples are not to be construed as limiting, as these and other embodiments will become apparent to those versed in the art from a reading of the present disclosure and the accompanying claims.

Example 1

Fifteen grams of commercially available poly(vinyl pyrrolidone) having a degree of polymerization of 300 to 500 are dissolved with stirring in 100 grams of ethanol (95%) at 50° C. To this solution is next added a solution of one gram of prostaglandin, $PGE_1$ (11α,15(S)-dihydroxy-9-oxo-13-trans-prostenoic acid) and 5 mg. of butylated hydroxy anisole is 20 ml. of ethanol. The resulting freshly formed solution is maintained at 50° C. in a borosilicate glass tube of approximately one inch internal diameter for immediate use for coating substrate. Next, a coil of Nichrome wire, 28 gauge B & S, external diameter 0.120 inch, is shaped into a coil configuration with a number of turns per inch in the coil in which the individual turns just avoid contact with one another in the unstretched state. B & S is a standard method for expressing a gauge of wire. It is described for this wire and for many other wires that can be used as a substrate for this invention in Handbook of Chemistry and Physics, 51st edition, pages F–129 to F–137, 1970 to 1971, the Chemical Rubber Co. The coil is then entered into the glass tube containing the above prepared ingredients and passed from the top through the ethanol solution to the bottom of the tube, turned around, and emerged from the top of the tube. The coated coil is then suspended horizontally from its ends and an electrical current is passed through the wire to maintain its temperature at approximately 30° C., in the presence of a stream of dry air, allowing the ethanol to evaporate and leave a dry prostaglandin film on the total exposed surface of the coil. The coated coil is next cut into lengths to deliver the prostaglandin to blood by wedging it into tubing leading into a blood bag. The blood will dissolve the coating of prostaglandin $E_1$ off the coil when contact is made thereby.

Example 2

The above procedure is repeated in this example and all the conditions are as described except that commercially available platinum-iridium wire of 10 percent iridium is used in this example. The wire is of standard gauges, 12 gauge to 36 gauge, and the diameter of any shaped coil corresponds to the inside diameter of a preselected section of blood collecting tubing. For example, the coil is formed with a total diameter of ⅛ inch for subsequent insertion into a section of white poly(ethylene) tubing having an inside diameter of ⅛ inch and a wall thickness of ¹⁄₁₆ inch. The prostaglandins are pulse released from the coil on contact by blood, or plasma containing platelets. About 20 to 60 micrograms of $PGE_1$ are released from the coated coil for a 200 to 250 ml. sample of plasma.

Example 3

Twenty five grams of poly(vinyl alcohol) of molecular weight 37,000 are dissolved with gentle stirring in 300 ml. of distilled water at 25° C. To this solution is added a solution of 2 grams of 8-iso-$PGE_1$ (11α,15(S)-dihydroxy-9-oxo-13-trans-8-iso-prostenoic acid) and 10 mg. of butylated hydroxy toluene in 20 ml. of absolute alcohol. The resulting combined solution is maintained at room temperature in a glass flask with a one inch neck for subsequent use. Next, a 4-inch section of Nichrome wire of standard 26 gauge with an exterior diameter of 0.016 inch is shaped into a spring of consecutive turns with the number of turns at a maximum but avoiding contact with one another in the unstretched state. The spring is next fed into the flask, passed through the prostaglandin solution and emerged from the flask. The spring is then suspended horizontally from its ends and a current of dry air at room temperature is passed around and over the device, allowing the ethanol to leave and depositing a dry film of prostaglandin on the total surface of the spring. The coated spring is then cut into segments to deliver the required dosage of prostaglandin to blood, plasma, platelet concentrates or the like.

Example 4

A prostaglandin coating solution is prepared as follows: first, fifteen grams of poly(vinyl pyrrolidone) of a degree of polymerization of 300 to 500 are dissolved with gentle stirring in 100 grams of 95 percent ethanol by gently warming to about 50° C. To this warm solution is then added a freshly prepared solution of 1 gram of prostaglandin ω-homo-$PGE_1$ (11α,15(S)-dihydroxy-9-oxo-13-trans-ω-homo-prostenoic acid) in 20 ml. of ethanol. The resulting combined solution is then poured into a four foot section of medical grade, standard blood collecting, flexible poly(vinyl) chloride tubing. The tube has disposed therein a press-fitted serpentine 26 gauge wire that undulates with its curvature peaks resting against the internal wall of the tube. The internally housed serpentine wire spans the internal diameter of the tube to expose a large surface area. Next, one end of the tubing is pinched off, and the combined solution is poured into the tube and fully submerging the serpentine wire. The solution is allowed to remain therein for approximately 5 to 7 minutes to coat the wire with the prostaglandin. Next, the tube is allowed to drain for about 15 minutes in a vertical position. Then, a current of warm, 25° C. to 30° C., filtered, dry air is passed through the tube for 15 to 20 minutes to evaporate excess solvent. The dried deposit on the serpentine and on the inner wall of the tubing consists of the prostaglandin mixed with an acceptable carrier. This coating will dissolve completely when 500 ml. of whole blood or plasma at body temperature is passed through the tube by pulse and continually releasing into the solution the platelet anti-clumping prostaglandin.

Example 5

Following the Examples of 1 through 4, coating compositions comprising a carrier and a prostaglandin for coating a preshaped surface can be formulated by compounding medical grade gelatine of an average molecular weight of 35,000 to 40,000 and a prostaglandin; a composition of sodium alginate of average molecular weight of 1,500 and a prostaglandin; for coating substrates. Coated devices carrying prostaglandins prepared according to this example are useful for experimental studies with laboratory animals for ascertaining the in vivo effects of various dosages of prostaglandins, such as platelet studies, vascular integrity, and the like.

Example 6

A carrier solution is prepared by dissolving 50 grams of medical grade gelatin of 35,000 to 40,000 molecular weight in 100 ml. of distilled water. Next, a second solution is prepared by dissolving 100 mg. of prostaglandin $E_2$ (11α,15(S)-dihydroxy-9-oxo-5-cis, 13 - trans-prostadienoic acid) in 10 ml. of ethanol at 40° C., and this latter prepared solution is uniformly mixed with the former prepared solution. Next, 10 ml. of the mixed solutions is added to a warmed, 40° C., 2-foot length of medical grade poly(vinyl) chloride tubing housing an internally positioned metallic coil and suitable for use as interconnecting links for plastic containers of the type used in laboratories for isolating and studying blood components. The solution of the carrier and prostaglandin is distributed approximately evenly inside the tubing and on the coil as the tube is rotated about its long axis. The thin layer of prostaglandin is released on contact to a biological fluid as it flows through the tube.

Example 7

The addition of prostaglandin to blood according to the spirit of the invention is demonstrated as follows: first, a prostaglandin delivery device prepared according to the Example 1 is positioned in a section of medical grade poly(vinyl) chloride tubing. Next, the tubing is connected to a standard, inert, flexible poly(ethylene) blood collecting bag. Then, 250 ml. of canine blood is allowed to flow through the tubing and intimately contact the prostaglandin on the device. The device is then removed from the tubing, and a macroscopic examination evidenced an essentially uncoated device indicating that the prostaglandin is added to the media.

Example 8

Figure 8:
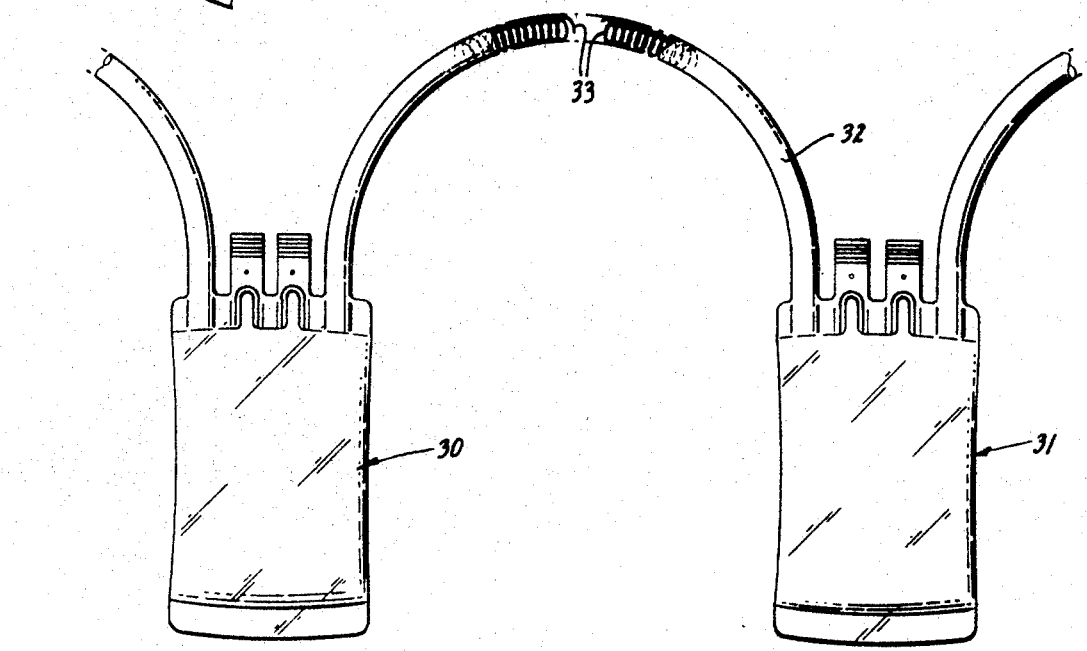
FIG. 8 further illustrates the use of the device of the invention, generally, in conformity to the use described for FIG. 7.

The addition of prostaglandin to plasma is demonstrated as follows: first, 430 ml. of fresh whole blood is collected into a standard blood container, as shown in FIG. 8 and identified as container 30. The container contains about 70 ml. of ACD (acid-citrate-dextrose solution, U.S.P. Formula A). Next, the container is centrifuged at $375 \times g$ for about 15 minutes at 20° C. After completion of the centrifuge period, the upper plasma portion containing the platelets is separated from the lower blood portion by transferring the plasma through tube 32 into bag 31. Tube 32 houses a device coated with $11\alpha,15\alpha$-dihydroxy-9-oxo-13-trans-prostenoic acid prepared according to Example 3, and as the plasma touches and flows through the coated device, the device adds the prostaglandin to the plasma. About 220 ml. of platelet-rich plasma is transferred from the first container to the second container and about 20 micrograms of prostaglandin is added to the plasma for the purpose of preserving and maintaining the functionality of the platelets in the plasma.

Having thus described the invention and various embodiments thereof that contribute to the art a novel and unobvious article of manufacture for adding prostaglandins that inhibit platelet aggregation to systems for collecting, storing and transfusing platelets, for laboratory platelet studies and the like, it is to be understood that the disclosure is not to be construed as limiting, as these embodiments and other variations will be obvious to those versed in the art from a reading of the present invention.

We claim:

1. An article of manufacture wherein said article is comprised of an inserter for a blood collection tube or blood bag having a large surface area relative to its volume and whose overall dimensions are adapted to fit into the inside diameter of the blood collection tube or blood bag, the inserter having a sinuous or serpentine, spiral, spring, or helical coil form, or an interwound grid or screen, or interwoven braided filament form, the inserter manufactured from a member selected from the group consisting of metals and alloys, and a coating of a blood platelet anti-aggregation prostaglandin on the surface of the inserter that is released in contact with the collected blood or a biological media containing blood aggregable platelets.

2. An article of manufacture according to claim 1 wherein the article comprises an inserter for a blood collection tube or blood bag substrate having a large surface area relative to the total volume of the insert substrate, a coating of a blood platelet anti-aggregation prostaglandin on the surface of the insert substrate, and wherein the blood platelet anti-aggregation prostaglandin is released from the surface when the article is contacted by collected blood or a biological media containing aggregable blood platelets.

3. An article of manufacture according to claim 2 wherein the blood platelet anti-aggregation prostaglandin is a member selected from the group consisting of $11\alpha,15(S)$-dihydroxy-9-oxo-13-trans prostenoic acid,
$11\alpha,15(S)$-dihydroxy-9-oxo-13-trans-prostenoic acid,
$11\alpha,15(S)$-dihydroxy-9-oxo-5-cis,13-trans-prostadienoic acid,
$15(S)$-hydroxy-9-oxo-5-cis,10,13-trans-prostatrienoic acid,
$9\alpha,11\alpha,15(S)$-trihydroxy-13-trans-prostenoic acid,
$9\alpha,11\alpha,15(S)$-trihydroxy-5-cis,13-trans-prostadienoic acid,
$11\alpha,15(S)$-dihydroxy-9-oxo-13-trans-8-iso-prostenoic acid,
$11\alpha,15(S)$-dihydroxy-9-oxo-13-trans-$\omega$-homo-prostenoic acid, the therapeutically acceptable salts, and the diastereomers thereof.

4. An article of manufacture according to claim 2 wherein the coated blood platelet anti-aggregation prostaglandin on the insert substrate is the acylated prostaglandin of 2 to 18 carbon atoms of the dihydroxy and trihydroxy prostaglandins.

5. An article of manufacture according to claim 2 wherein the biological media containing aggregable blood platelets is a member selected from the group consisting of a biological media containing platelets and platelets per se.

6. A process for essentially protecting platelets in blood, plasma, biological tissues and platelet concentrates against platelet aggregation wherein the process consists essentially of contacting a shaped metal or alloy inserter for a blood collection tube or blood bag in accordance with claim 1 coated with a blood platelet anti-aggregation prostaglandin that releases the prostaglandin to prevent platelet aggregation of the platelets contained in the contacting blood, plasma, biological tissues and platelet concentrates.

7. A process for essentially protecting platelets according to claim 6 wherein the coated prostaglandin is $11\alpha,15(S)$-dihydroxy-9-oxo-13-trans-prostenoic acid.

8. A process for essentially protecting platelets according to claim 6 wherein the coated prostaglandin is $11\alpha,15(S)$-dihydroxy-9-oxo-13-trans-8-iso-prostenoic acid.

9. A process for essentially protecting platelets according to claim 6 wherein the coated prostaglandin is $11\alpha,15(S)$-dihydroxy-9-oxo-13-trans-$\omega$-homo-prostenoic acid.

10. A process for adding a platelet anti-aggregation prostaglandin to biological fluids and tissues containing aggregable blood platelets wherein the process consists essentially of contacting the fluid containing blood platelets or tissue containing blood platelets with a blood platelet anti-aggregation prostaglandin coated metallic inserter for a blood collection tube or blood bag according to claim 1 that releases the anti-aggregation prostaglandin to the fluids and tissues when in contact with the inserter.

11. An article of manufacture comprising a shaped insert for a blood collection tube or blood bag substrate in accordance with claim 1 wherein the substrate is a member selected from the group consisting of a metal and an alloy, and a coating on the insert substrate comprising a blood platelet anti-aggregation prostaglandin and a therapeutically acceptable carrier.

12. An article of manufacture comprising a shaped insert substrate according to claim 11 wherein the coating contains an anti-oxidant.

13. An article of manufacture for adding a blood platelet anti-aggregation prostaglandin to a media comprising, in combination, a therapeutically acceptable blood collection tube with inlet and outlet apertures, an insert in accordance with claim 1 positioned within the tube, a coating of a blood platelet anti-aggregation prostaglandin on the surface of the inserter that is releasable therefrom, and wherein the blood platelet anti-aggregation prostaglandin is added to the collected blood or media as it contacts the inserter within the tube.

(References on following page)

References Cited

UNITED STATES PATENTS

| | | | |
|---|---|---|---|
| 243,396 | 6/1881 | Pfarre | 128—349 R |
| 3,585,647 | 6/1971 | Gajewski | 3—1 |
| 3,437,450 | 4/1969 | Greentwood | 23—258.5 |
| 3,291,568 | 12/1966 | Sautter | 23—258.5 |
| 2,934,067 | 4/1960 | Calvin | 23—258.5 |
| 3,467,095 | 9/1969 | Ross | 128—214.2 |
| 3,078,847 | 2/1963 | Wandell et al. | 23—258.5 |

FOREIGN PATENTS

| | | | |
|---|---|---|---|
| 440,731 | 7/1912 | France | 128—349 R |
| 699,253 | 11/1953 | Great Britain | 128—DIG. 026 |
| 320,155 | 2/1970 | Sweden | 128—214 R |

OTHER REFERENCES

Gardner et al.: J. Lab. Clin. Med. 43(2): 196–207, February 1954 "Platelet Transfusions Utilizing Plastic Equipment."

Walter et al.: Surg. Gyn. & OBST. 94(6): 687–692, June 1952 "A Closed Gravity Technique for the Preservation of Whole Blood in Acid Solution Utilizing Plastic Equipment."

SHEP K. ROSE, Primary Examiner

U.S. Cl. X.R.

3—1; 23—258.5; 128—214.2, 349 R

UNITED STATES PATENT OFFICE
CERTIFICATE OF CORRECTION

Patent No. 3,730,835          Dated May 1, 1973

Inventor(s) Harold M. Leeper and Peter W. Ramwell

It is certified that error appears in the above-identified patent and that said Letters Patent are hereby corrected as shown below:

Column 4, line 17, "protaglandin" should read --prostaglandin--;
Column 5, line 66, "100 µg/ml" should read --110 µg/ml--;
Column 6, line 58, "prostalglandin" should read --prostaglandin--

Column 5, line 69, "hte" should read -- The -- .

Signed and sealed this 20th day of August 1974.

(SEAL)
Attest:

McCOY M. GIBSON, JR.          C. MARSHALL DANN
Attesting Officer          Commissioner of Patents